May 7, 1963 I. M. VOGT 3,089,132

FERROELECTRIC CODE TRANSLATOR

Filed Dec. 30, 1958 4 Sheets-Sheet 1

INVENTOR
I. M. VOGT
BY
S.E. Hollander
ATTORNEY

FERROELECTRIC CODE TRANSLATOR

Filed Dec. 30, 1958 4 Sheets-Sheet 2

INVENTOR
I. M. VOGT
BY S. E. Hollander
ATTORNEY

INVENTOR
I. M. VOGT
BY S.E. Hollander
ATTORNEY

INVENTOR
I. M. VOGT
BY S.E. Hollander
ATTORNEY

United States Patent Office 3,089,132
Patented May 7, 1963

3,089,132
FERROELECTRIC CODE TRANSLATOR

Irmfried M. Vogt, East Orange, N.J., assignor to Bell Telephone Laboratories, Incorporated, New York, N.Y., a corporation of New York Filed Dec. 30, 1958, Ser. No. 783,852
20 Claims. (Cl. 340—347)

This invention relates to code translators and more particularly to a code translator utilizing ferroelectric condensers.

In telephone switching systems, the data introduced into the system is generally recorded in storage units and transferred within the system by means of combinations of signals on groups of interconnecting leads in which each combination represents an item of information or a code designation. One group of combinations, or one code, may be more economical or desirable from the standpoint of simplicity at a particular stage in the circuit than another. Consequently several combinations or codes representing equivalent information often exist in the same system. To translate rapidly from one code to another, code translating devices are utilized. Heretofore, conventional code translators have included matrices, such as diode matrices, which provide a particular output in response to the energization of a unique combination of input conductors.

For complex translations, however, a sizable matrix including a large number of input and output leads is required, necessitating expensive assembly requirements and high labor costs. A major element contributing to difficulty of assembly is the necessity for interconnecting in appropriate relation all of the individual logic elements ("and" gates, etc.) comprising the translator.

Relay translators, for example, require a prodigious number of interconnections between the contacts of the translator relays. The complexity is compounded in proportion to the number of digits to be translated. In short, it is manifest, in examining prior art translators, that a single disadvantage lies in the necessity for the provision of external connections between one translator logic component and another.

It is, therefore, an object of this invention to provide a code translator utilizing ferroelectric condensers in which a substantially limited number of external connections are required.

A further object of this invention is to provide a ferroelectric translator in which the component matrices comprise slabs of ferroelectric material in which logic functions are completed within the slabs.

An additional object of this invention is to provide a ferroelectric code translator having an inherent inhibiting capability.

Still another object of this invention is to provide a ferroelectric translator in which a number of logic operations are performed within a single crystal.

These and other objects of the invention are achieved in an illustrative embodiment comprising a ferroelectric translator having a number of stages, wherein each of the stages includes a slab of ferroelectric material having input electrodes and a "tank" electrode on one face and output electrodes on the other face. The electrodes are arranged to intersect in accordance with a code to be translated. Each two input electrodes and tank electrode intersected by a particular output electrode collectively form an "and" gate.

Thus, if a positive signal is applied to a first of the two input electrodes, the ferroelectric condenser formed between the first input electrode and associated output electrode, and the condenser formed between the tank electrode and the associated output electrode switch orientation in series.

During the course of this operation the voltage across the condenser formed between the output electrode and the tank electrode does not exceed the coercive voltage. Consequently, no substantial output potential appears across an output resistance connected in shunt with this condenser.

Since the orientation of the condenser formed between the second input electrode and the output electrode, and the condenser formed between the tank electrode and the output electrode are now opposite, these condensers cannot switch orientation in series. Instead, on the advent of the next pulse, the condenser formed between the second input electrode and the output electrode switches orientation in series with the output resistance. The current thus driven through the output resistance produces a substantial output pulse which may be detected.

It is seen, therefore, that the application of an input pulse to a single input electrode does not produce an output signal. However, the simultaneous or sequential application of input pulses to the two input electrodes does produce an output signal.

Each crystal matrix in the instant embodiment includes a group of "and" gates similar to that described above, formed at the intersection of the respective electrodes thereby obviating the necessity for internal interconnections.

In another embodiment of this invention the stages may include an additional, or second, tank electrode intersecting all of the input electrodes and which serves as an inhibiting element. The operation of this arrangement is similar to that described above with the exception that when the input pulse is applied to the second input electrode, it is necessary to determine the condition of the second tank electrode. If the second tank electrode is connected in circuit and suitably biased, the second input pulse will no longer switch the condenser formed between the second input electrode and the output electrode in series with the output or load resistor. Instead, the second input pulse will now switch the condenser formed between the second input electrode and output electrode in series with the condenser formed between the output electrode and second tank electrode.

Thus, with the second tank electrode connected in circuit, an output from the load resistor is inhibited. If the connection to the second tank electrode is left open or reverse biased, the condenser formed between the second input electrode and output electrode will again switch in series with the load resistor to produce an output indication.

A feature of this invention is a ferroelectric translator circuit having a number of crystals serially connected in stages.

Another feature of this invention is a slab of ferroelectric material having input electrodes and a tank electrode on one face and output electrodes on the other face adapted for use as a code translator.

An additional feature of this invention is a slab of ferroelectric material with input electrodes and two tank electrodes on one face and output electrodes on the other face adapted for use as a code translator having an inhibiting capability.

Still another feature of this invention is the utilization of a slab of ferroelectric material having input, tank and output electrodes as a binary to one-out-of-four translator.

A further feature of this invention is the utilization of a slab of ferroelectric material having input, tank and output electrodes as a two-out-of-four to one-in-six translator.

These and other objects and features of the invention will be more readily comprehended from an examination of the following specification, appended claims and attached drawings, in which:

Figures 1A, 1B, 2, 3, 4:
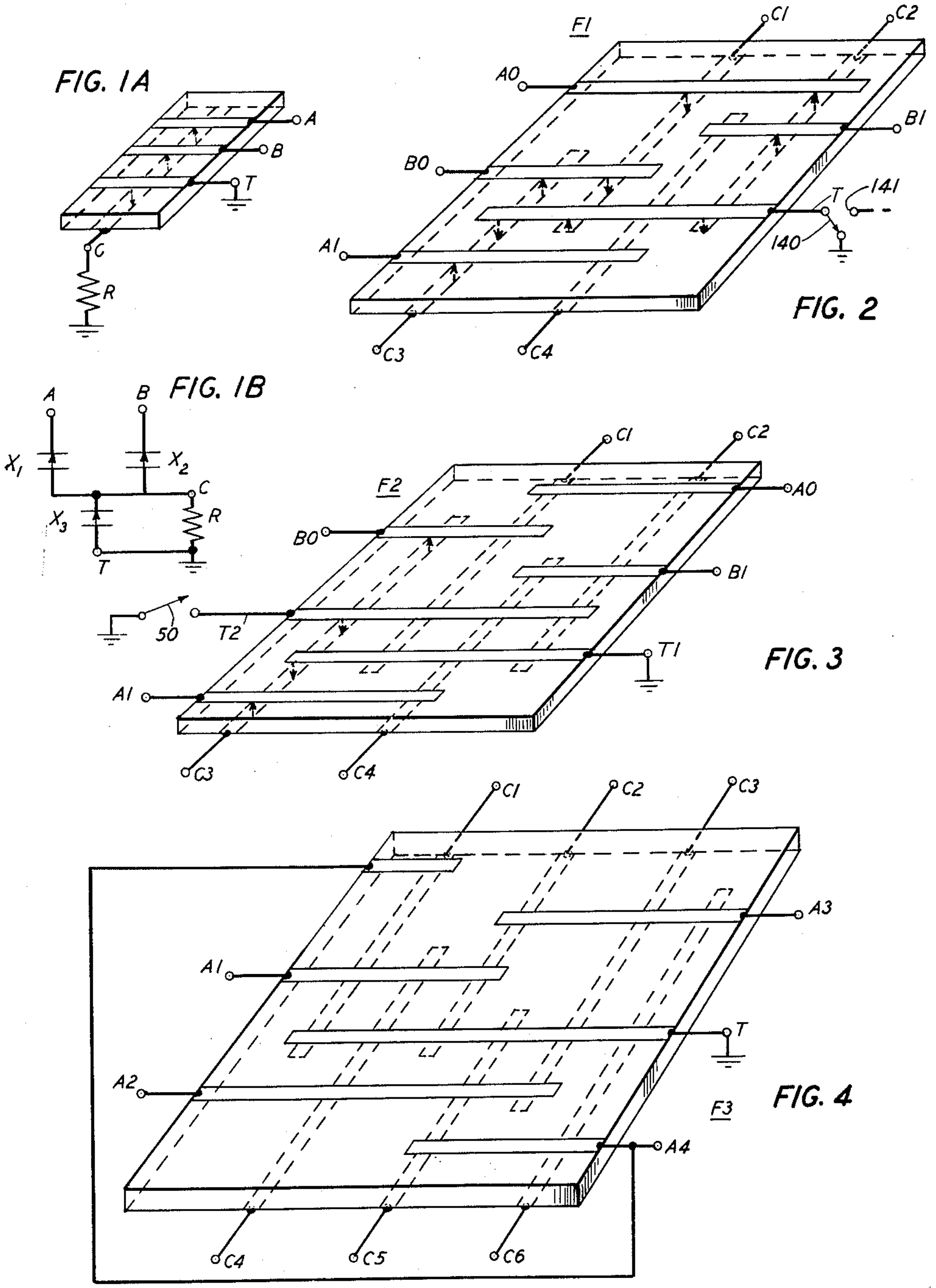
FIG. 1A is a ferroelectric slab comprising a single crystal having two input electrodes, a tank electrode and an output electrode.
FIG. 1B is an electrically equivalent arrangement of FIG. 1 using three separate crystals.
FIG. 2 is a 2-digit binary translator using a single ferroelectric crystal slab in which the majority of logic operations are performed within the crystal slab.
FIG. 3 is a 2-digit translator similar to FIG. 2 and having, in addition, an inhibiting capability effected by arranging the apparatus of FIG. 2 in a manner which includes a second tank electrode.
FIG. 4 is a two-out-of-four code translator using a single ferroelectric crystal slab with four input electrodes and six output electrodes.

Reference to FIGS. 1A and 1B will assist in comprehending the basic switching operation which occurs in the crystal matrices of FIGS. 2–4.

FIG. 1A shows a ferroelectric "and" gate comprising a single crystal having two input electrodes A and B and an output electrode C common to the two input electrodes and also to a tank electrode T. FIG. 1B indicates a similar 2-branch "and" gate comprising three separate crystals. For a comprehensive disclosure of an "and" circuit utilizing related principles of operation, reference may be made to E. E. Schwenzfeger, Patent 2,956,265 of October 11, 1960.

It will be assumed that initially the crystals are oriented as indicated by the arrows in FIGS. 1A and 1B. If a positive voltage is applied to input A (FIG. 1B), ferroelectric condenser X1 will be reoriented in series with crystal X3. The output voltage at electrode C during the switching operation will not exceed the coercive voltage $E_c$ of condenser X3. A positive potential E subsequently applied to terminal B cannot switch condenser X2 in series with condenser X3 since they are now oriented in opposite directions. The switching current for crystal X2 will, therefore, pass through resistance R. In this instance, the output voltage at electrode C will be $E-E_c$. If E is several times $E_c$ facile discrimination between the two distinct output voltages is possible.

In the case of the crystal of FIG. 1A the relative initial polarization of the condensers formed between electrodes A and B and the common electrode C and the polarization of the tank condenser T with respect to the common electrode C is the same as that shown in FIG. 1B for crystals X1, X2 and X3, respectively.

The operation of FIG. 1A is electrically the same as that of FIG. 1B. For an initial positive input at electrode A the condenser formed between electrode A and electrode C switches in series with the condenser formed between electrode T and electrode C. A subsequent positive pulse at terminal B will be unable to switch the condenser formed between electrode B and electrode C in series with the condenser formed between electrode T and electrode C in consequence of the opposite polarizations thereof. Thus, a pulse at terminal B will be driven through resistor R producing an output potential.

TWO-DIGIT TRANSLATOR

Referring now to FIG. 2, the crystal slab F1 includes four "and" gates having input electrodes A0, A1, B0 and B1 and output electrodes C1, C2, C3 and C4. A tank electrode T (connected to ground) is common to all four "and" gates. Output resistances (not shown) are connected to electrodes C1–C4 in the manner shown in FIGS. 1A and 1B. If a positive voltage is applied to one of the two electrodes A0 and A1, and to one of the electrodes B0 and B1, an output potential appears at one of the C electrodes according to the following code:

*Table I*

| Code | Positive Input at— | Output at— |
|---|---|---|
| 00 | A0, B0 | C1 |
| 01 | A0, B1 | C2 |
| 10 | A1, B0 | C3 |
| 11 | A1, B1 | C4 |

THREE-INPUT "AND" GATE

Referring further to FIG. 2 it may be shown that inputs at two of the input electrodes and the tank electrode (where the ground connection has been removed by shifting switch 140 to terminal 141) will serve to produce an output on one of the output electrodes when, and only when, two of the input electrodes and the tank electrode T are energized.

As an illustration, it will be assumed that the tank electrode T of FIG. 2, which is now isolated from ground, has a positive input pulse applied thereto. Coincidentally, a positive pulse is applied to electrode B0. If the initial polarization is in the direction shown by the arrows in FIG. 2 and it is assumed that each of the input electrodes and the tank electrode is grounded when no positive input pulse appears, then no output is produced at output electrode C1 since the condenser formed between electrode T and electrode C1 shifts in polarization in series with the condenser formed between electrode C1 and electrode A0. No change occurs in consequence of the positive input pulse at electrode B0 since the polarization of the condenser formed between electrode B0 and electrode C1 prevents further current flow due to a positive input pulse.

In this instance, the reversal of polarization of the condensers formed between output electrode C1 and electrodes T and A0 will produce a relatively small output pulse at electrode C1 corresponding to the coercive voltage of the ferroelectric condensers.

If it had been assumed that input pulses were applied to electrodes A0 and B0 in the positive direction and that electrode T was grounded, no output pulse will appear at electrode C1 since the initial polarization of the condensers between electrodes A0 and B0 and electrode C1 (as shown in FIG. 2) is in a direction to prevent further current flow in consequence of the application of a positive potential.

In a similar manner, it may be shown that a positive input on electrode A0 and a positive input on electrode T with a ground on conductor B0 will result in the reorientation of the condensers formed between electrode C1 and electrodes T and B0 in series. The condenser formed between electrode C1 and electrode A0 experiences no change in orientation since the original polarization is in a direction to prevent further current flow therethrough in consequence of a positive input pulse. Thus the only output voltage produced at electrode C1 results from the coercive voltage of the ferroelectric condensers.

However, if all three electrodes A0, B0 and T of FIG. 2 are concurrently energized by a positive pulse, an output will be produced at electrode C1. This follows since the condensers formed between electrode A0 and electrode C1, and electrode B0 and electrode C1 will experience no change in orientation in consequence of the initial polarization condition which prevents further current flow through the condensers due to the application of positive input potentials. Examining electrode T, however, it is seen that the condenser formed between electrode T and electrode C1 will be reoriented in consequence of the positive input pulse at electrode T. This reorientation is accomplished in series with the output resistance (not shown) connected to electrode C1.

Thus it has been demonstrated that an output will be produced at the output electrode when, and only when, all of the three associated electrodes on the face of the crystal opposite the output electrode are concurrently energized. If any lesser number than three are energized no output is produced. The circuitry of FIG. 2 thus lends itself to a flexible "and" gate arrangement through the utilization of tank electrode T as an input electrode.

TWO-DIGIT TRANSLATOR WITH INHIBITOR

In FIG. 3 a crystal F2 is shown similar to that of crystal F1 with the exception of an additional tank electrode T2 which enhances the flexibility of the translator by introducing an inhibiting capability.

If any particular group of condensers formed by a common output electrode is examined, for example electrode C3, it is seen that three ferroelectric condensers are formed in the manner described for FIG. 2. These include the condensers formed between electrode C3 and electrodes A1, B0 and T1. In addition, however, a fourth condenser is formed between electrode T2 and electrode C3. This second tank condenser is initially polarized in the same direction as the condenser formed between electrodes T1 and C3. Output resistances (not shown) are connected to electrodes C1–C4 in the manner shown in FIGS. 1A and 1B.

Thus, if it is assumed that a positive input pulse appears at terminal A1 with switch 50 in the open condition, the condenser formed between electrode A1 and electrode C3 switches in series with the condenser formed between electrode T1 and electrode C3 since they are initially polarized in the same direction with respect to each other.

If an input pulse is subsequently applied to terminal B0 while switch 50 remains open, an output potential appears across the resistance connected to electrode C3 in the manner heretofore explained. If, however, switch 50 is closed at the time of the appearance of the input pulse at electrode B0 or prior thereto, the condenser formed between electrode B0 and electrode C3 will switch in series with the condenser formed between electrode T2 and electrode C3, thus preventing a substantial output pulse across the output resistance (not shown).

Since the introduction of tank electrode T2 into the circuit in effect prevents an output, although both electrodes A1 and B0 are energized, tank electrode T2 displays an inhibiting function. This inhibiting function is particularly advantageous in matrix operation, as shown herein.

The code translation for crystal F2 when switch 50 is open is the same as that shown in Table I above for crystal F1.

TWO-OUT-OF-FOUR CODE TRANSLATOR

FIG. 4 demonstrates a crystal matrix for decoding a two-out-of-four code. An output is produced if any two of the electrodes A1, A2, A3 and A4 are energized. Thus, for example, if electrodes A1 and A2 are energized, an output is produced at electrode C4, the only output electrode common to electrodes A1, A2 and the tank electrode T. Similarly, other combinations of inputs of electrodes A1–A4 will energize the output electrodes in accordance with the following arrangement:

*Table II*

| Positive Input at— | Output at— |
|---|---|
| A1, A2 | C4 |
| A1, A3 | C2 |
| A1, A4 | C1 |
| A2, A3 | C3 |
| A2, A4 | C5 |
| A3, A4 | C6 |

TWO-STAGE 4-DIGIT TRANSLATOR

Figure 5:
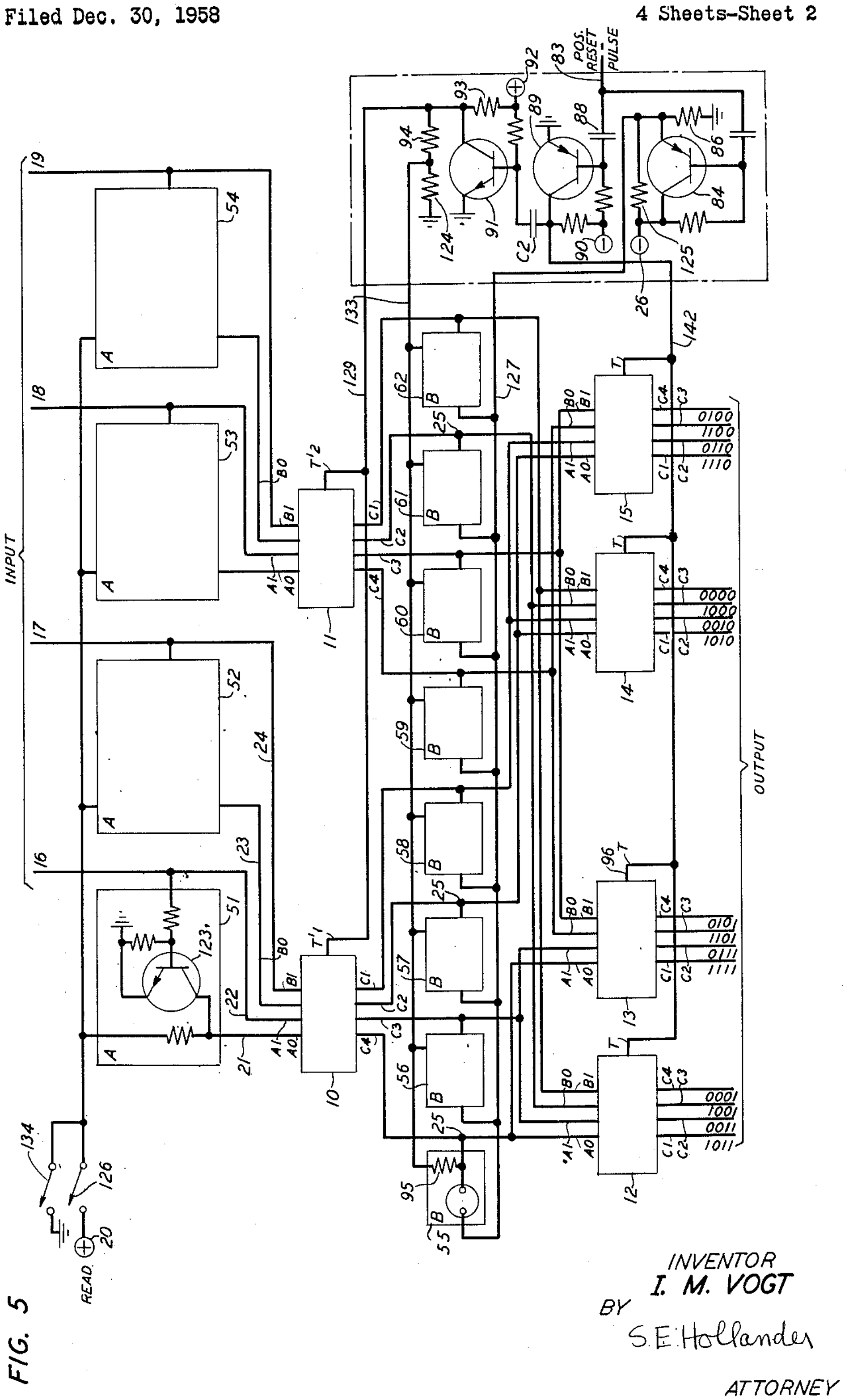
FIG. 5 is a 4-digit code translator comprising six crystal slabs arranged in two stages.

FIG. 5 demonstrates a circuit for decoding a 4-digit code using six crystal matrices. Translation is accomplished in two stages, crystals 10 and 11 comprising the first stage and crystals 12–15 comprising the second stage.

The input to the first stage is inverted through transistor switches 51–54 all of which are similar and shown in detail for inverter switch 51. The output from the first stage crystals 10 and 11 is amplified before introduction into the second stage crystals 12–15 by gas diode amplifiers 55–62 all of which are the same and shown in detail for gas diode amplifier 55.

Each of the crystals 10 and 11 is similar to crystal F1 shown in detail in FIG. 2. The second stage crystals 12–15 are the same as crystals 10 and 11 but are initially polarized in a direction opposite to that of crystals 10 and 11.

When input potentials are applied at terminals 16–19, the output translation is obtainable at sixteen output electrodes each designating a 4-digit binary number.

In the following explanation, negative input pulses at terminals 16–19 constitute binary "0" indications and positive pulses binary "1" indications.

Assuming that binary number 0101 is to be translated, terminals 16–19 would be respectively negative, positive, negative, positive. The input at terminal 16, being negative, will not affect the associated inverting stage 51 in view of the application of a negative potential to the base electrode of transistor 123. The collector potential of transistor 123 is, therefore, approximately equal to the potential of source 20 when switch 126 is closed. Conductor 21, which is connected to the collector electrode of transistor 123, is consequently also approximately at the potential of source 20. Thus, conductor 21 at input electrode A0 of crystal 10 is positive and conductor 22 at terminal A1 connected to conductor 16 is negative.

Similarly, the input at electrode B1 of crystal 10 over conductor 24 is positive in view of the assumed positive input at terminal 17 and the input at electrode B0 of crystal 10 over conductor 23 is negative as a result of inverter 52. It may be noted that the transistor (not shown) in inverter 52 is rendered conducting by the positive input pulse at the base electrode thereof whereupon the collector potential of the transistor falls from a potential approximating source 20 to near ground potential.

In consequence of the positive input pulses at electrodes A0 and B1 of crystal 10 (shown in detail in FIG. 2), an output pulse is produced at terminal C2.

A similar analysis of the input potentials to terminals 18 and 19 indicates that a positive input potential appears at terminals A0 and B1 of crystal 11. An output potential is, therefore, produced at electrode C2 of crystal 11.

The output pulses at electrodes C2 of crystals 10 and 11 are amplified in gas diode amplifiers 57 and 61 shown in detail for amplifier 55. Ordinarily, gas diode amplifiers 55–62 are non-conducting and the potential at terminals 25 is approximately ground potential over resistances 95 (see amplifier 55) and resistance 124.

The positive output pulse at terminals C2, however, is sufficient to drive the associated gas diodes into the conducting condition at which time the potential at terminal 25 falls from approximately ground potential to a considerably more negative potential approaching the potential at source 26 less the sustain voltage of the associated gas diode over a circuit from source 26, collector-emitter path of transistor 84 and conductor 127.

It may be noted that although crystals 12–15 are structurally similar to crystals 10 and 11, which are shown in detail in FIG. 2, the initial polarization for the individual condensers of crystals 12–15 is opposite to that shown in FIG. 2 for the individual condensers of crystals 10 and 11. Thus the positive output at terminals C2 of crystal 11, which was amplified in gas diode amplifier 61 and converted to a negative pulse, is of the correct polarity for application to electrode B0 of crystal 14 and electrode B0 of crystal 12.

Similarly, the output from electrode C2 of crystal 10 is amplified in gas diode amplifier 57 and applied to electrode A0 of crystal 14 and electrode A0 of crystal 15.

In consequence, it is seen that crystals 12 and 15 each receive one input pulse, crystal 13 receives no input pulse and crystal 14 receives two input pulses. Since, as demonstrated in the case of FIG. 2, two input pulses are required to produce an output potential, crystal 14 alone produces an output in consequence of the input at electrodes A0 and B0. This output potential appears at output electrode C1 comprising binary digit 0101.

RESTORING CRYSTALS TO ORIGINAL POLARIZATION

Before utilizing the translation circuit for an additional translation function, it is necessary to reset crystals 10–15 to their original polarization condition. When the translating function has been completed, as described above, and an output has been produced, all of the crystals may be reset by a positive input pulse on reset conductor 83. As a result of the positive reset pulse, transistor 84 is rendered non-conducting to produce a negative potential approximating source 26 at the collector electrode thereof. The potential on conductor 127, which was previously at the potential of source 26 in view of the conducting condition of transistor 84, is now raised to a higher potential representing the voltage drop across resistance 86. This decrease in negative potential on conductor 127, when applied to the cathodes of gas tubes 55–62, renders those tubes non-conducting.

Concurrently with the deenergization of gas tubes 55–62, the positive pulse at conductor 83 is coupled through capacitor 88 to the base electrode of transistor 89 rendering transistor 89 non-conducting. The collector potential of transistor 89, which previously approximated ground potential, is now driven in the negative direction to the potential of source 90. This negative excursion at the collector electrode of transistor 89 is coupled through capacitor C2 to the base electrode of transistor 91 to drive transistor 91 into the non-conducting condition.

The potential at the collector electrode of transistor 91 is driven from approximately ground potential to the potential of source 92. Thus a positive pulse appears via conductor 129 at the tank electrodes T'1 and T'2 of crystals 10 and 11 which correspond to tank electrode T of crystal F1 of FIG. 2. This positive pulse at the tank electrodes serially reorients the condensers formed between each tank electrode and the associated output electrode and the condenser formed between one of the associated input electrodes and the output electrode in each "and" gate of crystals 10 and 11. In this respect, it is assumed that the input electrodes of crystals 10 and 11 are biased by a negative voltage or grounded when no input appears.

The remaining condenser formed between the output electrode and the other input electrode is reoriented in polarization over a path from potential source 92, resistance 93, resistance 94, conductor 133, resistances 95 of amplifiers 55–62 to the output electrodes of crystals 10 and 11 and through the crystal slab to the input electrodes.

For purposes of explanation, a specific application of the above-described reorientation procedure will be examined. In particular, the reorientation of the condensers formed between output electrode C2 of crystal 11 and the associated input electrodes A0 and B1, and the condensers formed between output electrode C2 and tank electrode T'2 will be examined in detail.

The positive pulse appearing at the collector electrode of transistor 91 in the manner described above is conveyed over conductor 129 to the tank electrode T'2 of crystal 11 which corresponds to tank electrode T of crystal F1 of FIG. 2. It is seen from FIG. 2 that the application of a positive pulse to the tank electrode T results in the serial reorientation of the condenser formed between tank electrode T and output electrode C2 in series with the condenser formed between the output electrode C2 and one or the other of the input electrodes A0 or B1. As explained above, it is assumed that the input electrodes are all negatively biased or grounded when no input pulse appears (e.g., by opening switch 126 and closing switch 134).

The tank electrode T'2 is no longer grounded but is now connected to a source of positive potential; thus the potential differences applied to the tank electrode and the input electrodes are arranged to reproduce the original polarization conditions shown in FIG. 2.

Assuming that the condenser formed between output electrode C2 and input electrode B1 switches in series with the condenser formed between output electrode C2 and tank electrode T in FIG. 2, it still remains necessary to reorient the condenser formed between output electrode C2 and input electrode A0. The path for reorienting the remaining condenser in FIG. 5 may be traced from potential source 92, resistance 93, resistance 94, conductor 133, resistance 95 (not shown) of gas diode amplifier 61, output electrode C2 of crystal 11 through the crystal slab, input electrode A0 of crystal 11 to ground at switch 134 thereby reorienting the remaining condenser.

The ferroelectric condensers of crystals 12–15 are reoriented over conductor 142 which is now at a negative potential from source 90 in view of the non-conducting condition of transistor 89. This negative potential applied to the tank electrodes T of crystals 12–15 reorients the condensers formed between the tank electrode and the output electrode in series with the condensers formed between the output electrode and one of the input electrodes serially in the manner described for crystals 10 and 11. It may be noted that a different reorientation polarity is required for the tank electrodes of crystals 12–15 since the initial polarization condition of crystals 12–15 is opposite to that of crystals 10 and 11 as described above.

Here again the remaining condenser formed between the output electrode and the other input electrode must be reoriented and the path for the reorientation of the remaining condensers may be traced from potential source 92, resistance 93, resistance 94, conductor 133, resistances 95 of gas diode amplifiers 55–62 to the respective input electrodes of crystals 12–15 and through the crystal slab to the output electrodes and ground to reorient the remaining condenser.

As a specific illustration of the manner in which the condensers formed by the output electrode C4 of crystal 14 and the associated tank and input electrodes are reoriented, a path may be traced from the collector electrode of transistor 89, which is now at a negative potential as described above, conductor 142 to the tank electrode T of crystal 14. The application of the negative potential to the tank electrode T demonstrates, through reference to FIG. 2, that the condenser formed between the tank electrode T and the output electrode C4 will be reoriented in series with the condenser formed between the output electrode C4 and one or the other of the input electrodes A1 or B1. If it is assumed that the condensers formed between the tank electrode T and the output electrode C4 and between the output electrode C4 and the input electrode A1 are serially reoriented, the path includes the negative potential introduced at the tank electrode from source 90 and the positive potential introduced at electrode A1 through resistance 95 (not shown) of amplifier 58, conductor 133, resistance 94, resistance 93 to source 92.

The remaining condenser formed between input electrode B1 and output electrode C4 is reoriented over a path from source 92 to input electrode B1 via resistance 93, resistance 94, conductor 133, resistance 95 of gas diode amplifier 62 to electrode B1 and through the crystal slab to output electrode C4 and output resistance and ground (not shown).

FIVE-DIGIT DECODER

Figure 6:
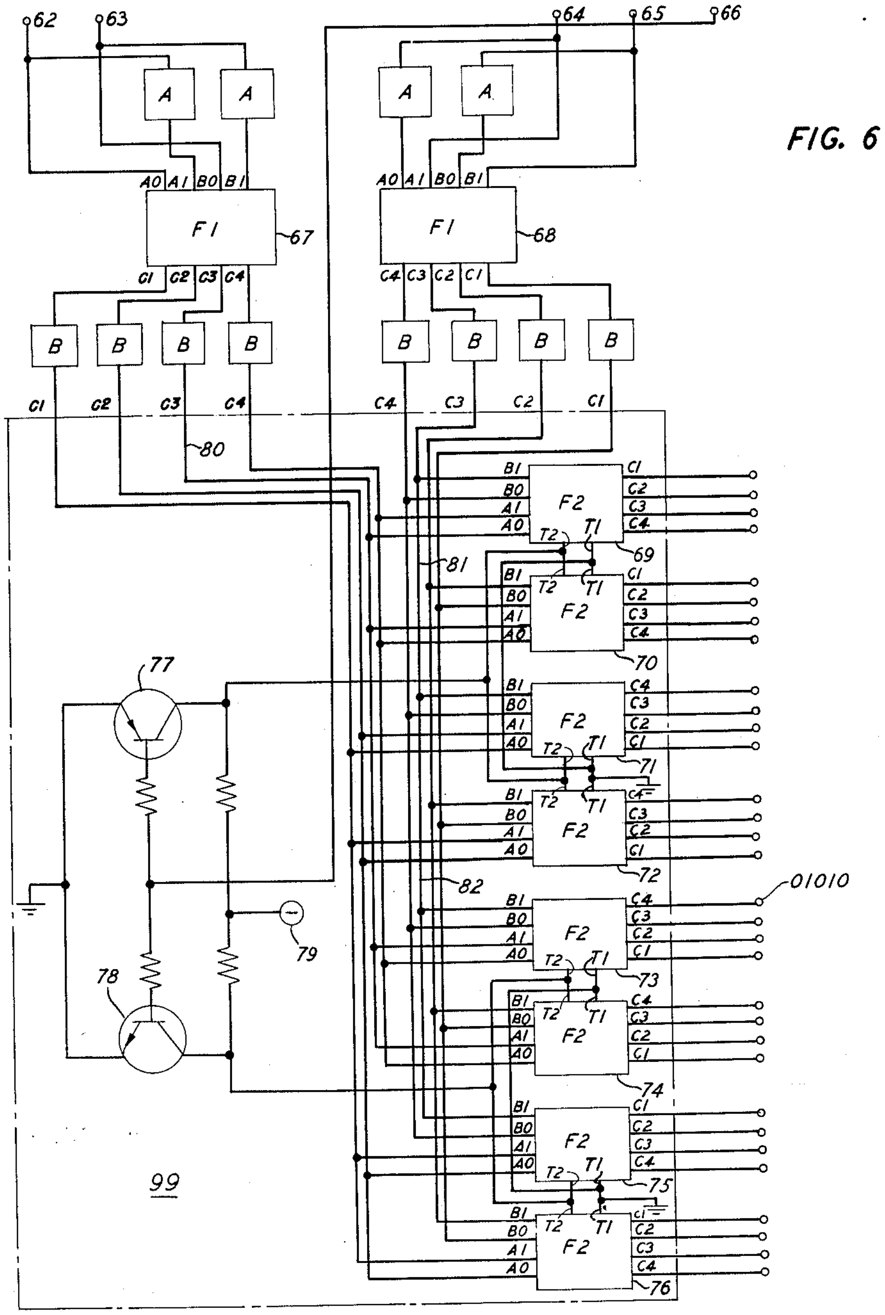
FIG. 6 is a 5-digit code translator in which one of the digital inputs controls inhibiting potentials applied to a group of crystals.

FIG. 6 is a representation of a translator circuit which is adapted to decode a 5-digit code. The fifth digit input at terminal 66 determines which of the tank electrodes T2 of FIG. 3 will be grounded. Translation is again accomplished in two stages. In this instance the first stage includes crystals 67 and 68 and the second stage is divided into two groups, one group including crystals 69–72 and the other group crystals 73–76.

Each of the crystals of the first group comprises crystals similar to crystal F1 or F2 shown in detail in FIG. 2 and FIG. 3. For the purpose of this explanation, it will be assumed that crystals 67 and 68 of the first stage comprise crystals similar to crystal F1 shown in detail in FIG. 2. The second stage crystals 69–76 are each similar to crystal F2 shown in detail in FIG. 3 and each include the second tank electrode T2 of FIG. 3. Inversion of the input signals at terminals 62–65 is performed in transistor inverter switches A shown in detail for transistor switch 51 of FIG. 5.

The output signal of the first stage crystals 67 and 68 is amplified in gas tube amplifiers B shown in detail for gas tube amplifier 55 of FIG. 5. The connections between the first and second stages of the 5-digit decoder are similar to that of the 4-digit translator shown in FIG. 5 with the exception that the output of the first stage is delivered in parallel to the two groups comprising the second stage crystals. The input potential at terminal 66 determines which of the two groups of crystals 69–72 and 73–76 will be operative. Discrimination is accomplished through the use of transistors 77 and 78.

If the input potential at terminal 66 is a binary "0" condition or negative potential, transistor 77 is energized in its low impedance condition and transistor 78 is rendered non-conducting. As a consequence, the collector potential of terminal 77 approximates ground potential which is applied to the tank electrodes T2 of crystals 69–72 to forward bias the ferroelectric condensers formed between tank electrode T2 and all of the output electrodes C1–C4 of those crystals. It is assumed as in FIG. 5 that the second stage crystals 69–76 are all initially oppositely polarized to the first stage crystals 67 and 68.

The collector potential at transistor 78 is approximately equal to the potential source 79, in consequence of which tank electrodes T2 of crystals 73–76 are polarized in a manner to permit output signals from the associated output electrodes.

It will be assumed for illustrative purposes that the inputs to terminals 62–66 are respectively 01010. The inputs to crystal 67 are in consequence negative at input electrode A0, positive at input electrode A1, positive at input electrode B0 and negative at input electrode B1.

Similarly, the input potentials at input electrodes A0, A1, B0 and B1 of crystal 68 are respectively negative, positive, positive, negative. In view of the configuration of crystals 67 and 68 shown in detail in FIG. 2, an output potential is developed at output electrodes C3. The output potentials developed in electrodes C3 of crystals 67 and 68 are amplified in the associated gas tube amplifiers B and transmitted to the following stage over conductors 80 and 81.

Input pulses are in consequence provided at input electrode A0 of crystals 69 over conductor 80 and input electrode B1 of crystal 69 over conductor 81. Additional input pulses are provided at input electrode B1 of crystal 71 over conductor 81 and at input electrode A1 of crystal 70 over conductor 80. Thus, in the group of crystals 69–72, crystal 69 receives two input pulses, crystals 70 and 71 each receive one input pulse and crystal 72 receives no input pulses.

Examining the group of crystals including crystals 73–76 it is seen that input potentials appear at electrodes B1 of crystals 73 and 75 over conductor 82. Additional input potentials appear at input electrodes A1 of crystals 73 and 74 over conductor 80. Thus crystal 73 receives two input pulses, crystals 74 and 75 each receive one input pulse and crystal 76 receives none.

The negative input potential at terminal 66 representing the "0" condition, energizes transistor 77 in the low impedance condition and transistor 78 in the high impedance condition, as explained above. The collector potential of transistor 78 approximates the potential of source 79 to bias the condensers formed between the output and tank electrodes T2 of crystals 73–76 in a direction to prevent reorientation thereof in series with the condensers formed between the input electrodes and the output electrodes. In consequence, crystal 73, which receives two input pulses, will produce an output pulse since the tank electrode T2 of crystal 73 is, in effect, disconnected from the circuit. Crystals 74 and 75 which receive only one input pulse will not produce an output pulse.

In examining the group of crystals comprising crystals 69–72, it is seen that the condensers formed between the output and tank electrodes T2 are biased in a direction which will permit reorientation in series with the condensers formed between the input electrodes and the output electrodes. This follows from the ground potential applied to the tank electrodes T2 of crystals 69–72 from the collector of transistor 77.

Crystal 69, which under ordinary circumstances would have produced an output potential in view of the two input pulses thereto, is inhibited from doing so by tank electrode T2 in the manner explained in discussing FIG. 3. Crystals 70–72 do not produce an output pulse since they have less than two input pulses applied thereto.

Consequently, the only output is produced from the group of crystals 73–76. In view of the input potentials at electrodes A1 and B1 of crystal 73 and the consequent output potential at electrode C4 (see FIG. 3), an output pulse at terminal 01010 is produced representing the desired translation.

Although no reset circuitry is shown for the translator of FIG. 6, it is understood that an arrangement similar to that of FIG. 5 may be illustratively employed.

5-DIGIT TO FOUR-OUT-OF-SEVEN CODE TRANSLATOR

Figure 7:
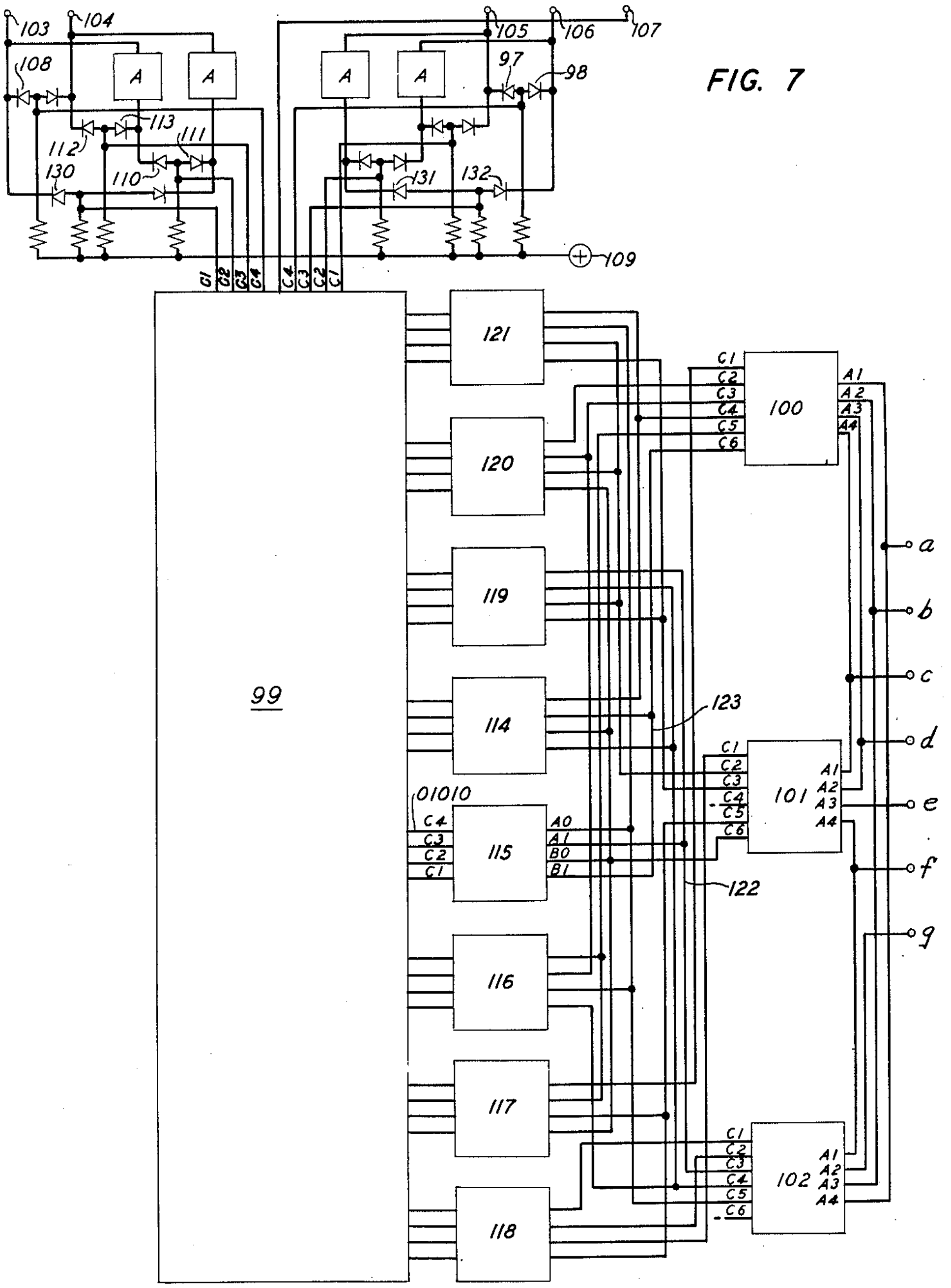
FIG. 7 is a 5-digit code translator to a four-out-of-seven code in which translation is achieved in a series of stages.

FIG. 7 shows a circuit for code conversion from a 5-digit code to a four-out-of-seven code including a plurality of stages wherein the initial stage of decoding is accomplished by diodes 97, 98, etc.

The crystals included in the outline form, designated generally as 99, comprise crystals 69–76 and associated equipment shown within the dotted lines of FIG. 6. It is assumed that the condenser area of each electrode of crystals 100–102 has less than one-quarter of the condenser area of each electrode of crystals 69–76. Crystals 114–121, shown in outline form and similar in all respects to crystal F1 of FIG. 2, are interposed between the output conductors of equipment 99 and the input conductors of crystals 100–102.

The latter crystals are also shown in outline form only but comprise in each instance a ferroelectric crystal F3 of FIG. 4. No reorientation circuit is shown in FIG. 7 for purposes of clarity, but a reset circuit similar to that of FIG. 5 may be illustratively employed.

In view of the relationship of the area of the electrodes of condensers 69–76 of equipment 99 to the area of the electrodes of condensers 100–102, no intermediate amplification is required. Transistor inverters A, shown in detail for inverter 51 of FIG. 5, are utilized at the input to provide the inverse of input signals where appropriate.

In describing the operation of the circuit of FIG. 7, it will be assumed that the inputs at terminals 103–107 are respectively 01010. Since a binary "0" input has been assumed to be negative and a binary "1" input positive, the inputs at terminals 103 and 104 are respectively negative and positive. As a result, the input at left terminal C1 is negative in view of the forward bias condition at diode 130. The input at left terminal C2 is negative in view of the forward bias condition of diode 111.

At left terminal C3 the input is positive from source 109 since diode 112 and diode 113 are both biased nonconducting. The input at left terminal C4 is negative in view of the forward bias condition of diode 108.

A similar analysis for right terminals C1–C4 will indicate that only right terminal C3 is positive due to the reverse bias condition at diodes 131 and 132. In accordance with the explanation heretofore given for the operation of equipment 99 with regard to the description of the circuitry of FIG. 6, it is seen that output terminal 01010 is energized in view of the positive input potentials on left terminal C3, right terminal C3 and the negative potential on terminal 107.

As discussed above, crystals 114–121 are similar in all respects to crystal F1 shown in detail in FIG. 2. Under the arrangements shown for FIG. 7, however, the input to the respective crystals 114–121 is applied at the output electrodes C1–C4 rather than the input electrodes A0, A1, B0 and B1.

In the assumed illustration, output terminal 01010 of equipment 99 is connected to electrode C4 of crystal 115. Examining the circuitry of FIG. 2, it is seen that an input on electrode C4 will produce an output on electrodes A1 and B1. These outputs are further conveyed over conductors 122 and 123 to the stage of translating crystals including crystals 100–102.

Conductor 122 conveys the output pulse from electrode A1 of crystal 115 to input electrode C3 of crystal 102. Conductor 123 transfers the output pulse from electrode B1 of crystal 115 to electrode C6 of crystal 100. Thus crystal 100 receives one input pulse over electrode C6 and crystal 102 receives an input pulse over electrode C3.

As indicated above, crystals 100–102 are structurally similar to crystal F3 shown in detail in FIG. 4 with the exception that the inputs to crystals 100–102 are now made at the output electrodes C1–C6 of FIG. 4.

Examining crystal F3 of FIG. 4 to observe the operation of crystal 100, it is seen that an input pulse on electrode C6 results in an output pulse on terminals A3 and A4.

Output pulses are similarly produced at terminals A2 and A3 of crystal 102.

Thus the energization of terminals *b*, *c*, *d* and *g* represents the code translation of input code 01010.

Other 5-digit input codes may be similarly analyzed to determine the corresponding output code.

Although specific embodiments of the invention have been illustrated, it is understood that various modifications may be made by those skilled in the art without departing from the spirit and scope of the invention.

What is claimed is:

1. A ferroelectric translator comprising a slab of ferroelectric material, spaced input electrodes disposed on one face of said slab, spaced output electrodes disposed on the opposite face of said slab and positioned to intersect said input electrodes in accordance with a code to be translated, unit area condensers being formed at the intersection of said electrodes, a common electrode disposed on said one face of said slab and positioned to intersect all of said output electrodes to form additional condensers, and a plurality of output conductors individually connected to said output electrodes, the area of each of said additional condensers formed between said common electrode and a particular output electrode being one unit less than the sum of the units of area of said condensers formed between said input electrodes and said particular output electrode.

2. A ferroelectric translator comprising a slab of ferroelectric material, spaced input electrodes disposed on one face of said slab, spaced output electrodes disposed on the opposite face of said slab and positioned to intersect said input electrodes in accordance with a code to be translated, unit area condensers being formed at the intersection of said electrodes, a plurality of electrically distinct output terminals individually connected to said output electrodes, and a tank electrode disposed on said one face of said slab and positioned to intersect all of said output electrodes to form additional condensers, the area of each of said additional condensers formed between said tank electrode and a particular output electrode being one unit less than the sum of the units of area of said condensers formed between said input electrodes and said particular output electrode, means connecting said tank electrode to a source of reference potential, and means for activating selected input electrodes in accordance with the code to be translated thereby to energize one of said output terminals.

3. A ferroelectric translating device comprising a slab of ferroelectric material, spaced input electrodes disposed on one face of said slab, spaced output electrodes disposed on the opposite face of said slab and positioned to intersect said input electrodes in accordance with a code to be translated, a plurality of independent output conductors individually connected to said output electrodes, unit area condensers being formed at the intersection of said electrodes and having a first initial polarity, a tank electrode disposed on said one face and positioned to intersect all of said output electrodes to form additional condensers having a second initial polarity, the area of each of said additional condensers formed between said tank electrode and a particular output electrode being one unit less than the sum of the units of area of said condensers formed between said input electrodes and said particular output electrode, means connecting said tank electrode to a source of reference potential, and means for activating selected input electrodes in accordance with the code to be translated thereby to energize one of said output conductors.

4. A ferroelectric translator comprising a slab of ferroelectric material, spaced input electrodes disposed on one face of said slab, spaced output electrodes disposed on the opposite face of said slab and positioned to intersect said input electrodes in accordance with a code to be translated, a plurality of electrically isolated output conductors individually connected to said output electrodes, unit area condensers being formed at the intersection of said electrodes, and spaced first and second common electrodes disposed on said one face and positioned to intersect all of said output electrodes to form a number of additional condensers, the sum of the areas of each of said additional condensers formed between said common electrodes and a particular output electrode being equal to the sum of the areas of said condensers formed between said input electrodes and said particular output electrode.

5. A ferroelectric translator comprising a slab of ferroelectric material, spaced input electrodes disposed on one face of said slab, spaced output electrodes disposed on the opposite face of said slab and positioned to intersect said input electrodes in accordance with a code to be translated, a plurality of electrically distinct output conductors individually connected to said output electrodes, condensers having a first initial polarity being formed at the intersection of said electrodes, first and second tank electrodes disposed on said one face of said slab and positioned to intersect all of said output electrodes to form additional condensers having a second initial polarity, the sum of the areas of said additional condensers formed between said tank electrodes and a particular output electrode being equal to the sum of the areas of said condensers formed between said input electrodes and said particular output electrode, and means for varying the initial polarity of said condensers formed between said tank electrodes and said particular output electrode.

6. A ferroelectric translator comprising a slab of ferroelectric material, spaced input electrodes disposed on one face of said slab, spaced output electrodes disposed on the opposite face of said slab and positioned to intersect said input electrodes in accordance with a code to be translated, condensers being formed at the intersection of said electrodes having a first initial polarity, a plurality of electrically distinct output terminals individually connected to said output electrodes, first and second tank electrodes disposed on said one face of said slab and positioned to intersect all of said output electrodes to form additional condensers having a second initial polarity, the sum of the areas of said additional condensers formed between said tank electrodes and a particular output electrode being equal to the sum of the areas of said condensers formed between said input electrodes and said particular output electrode, means for varying the initial polarity of said condenser formed between said second tank electrode and said particular output electrode, means for connecting said first tank electrode to a source of reference potential and means for activating selected input electrodes in accordance with the code to be translated thereby to energize one of said output terminals.

7. A ferroelectric translator comprising a slab of ferroelectric material, four spaced input electrodes on one face of said slab, six spaced output electrodes disposed on the opposite face of said slab and positioned to intersect said input electrodes in accordance with a code to be translated, condensers being formed at the intersection of said electrodes, six individual output conductors connected to said output electrodes, a common electrode disposed on said one face and positioned to intersect all of said output electrodes to form a number of additional condensers, the area of each of said additional condensers formed between said common electrode and a particular output electrode being one unit less than the sum of the units of area of said condensers formed between said input electrodes and said particular output electrode, means connecting said common electrode to a source of reference potential, and means for activating said selected input electrodes in accordance with the code to be translated thereby to energize one of said output conductors.

8. A ferroelectric translator including a plurality of stages of ferroelectric crystal translators, said crystal translators having input and output electrodes and electrically distinct output conductors individually connected to said output electrodes, means for selectively connecting the output conductors of one of said stages to the input electrodes of another stage in accordance with a code to be translated, means for energizing selected input electrodes to said one stage of crystals thereby energizing one of said output conductors in said other stage of crystals.

9. A ferroelectric translator in accordance with claim 8 wherein said crystal translator stages comprise a slab of ferroelectric material, said input electrodes being disposed on one face of said slab, said output electrodes being disposed on the opposite face of said slab and positioned to intersect said input electrodes in accordance with a code to be translated, unit area condensers being formed at the intersection of said electrodes, and a common tank electrode disposed on said one face of said slab and positioned to intersect all of said output electrodes to form additional condensers, the area of each of said additional condensers formed between said common electrode and a particular output electrode being one unit less than the sum of the units of area of said condensers formed between said input electrodes and said particular output electrode.

10. A ferroelectric translator comprising a plurality of stages, each of said stages including a group of ferroelectric crystal translators, said crystal translators having input and output electrodes and electrically distinct output conductors individually connected to said output electrodes, said group of a terminal one of said stages including two subgroups, means for selectively connecting the output conductors of a preceding one of said stages in parallel to the input electrodes of said two subgroups of crystal translators, means for selectively energizing selected input electrodes to said first stage of crystals and for selectively conditioning one of said two subgroups thereby energizing one of said output conductors in one of said subgroups of said terminal stage of crystals.

11. A ferroelectric translator comprising a plurality of stages, an initial stage including two ferroelectric crystal translators, a terminal stage including a first group of four ferroelectric crystal translators and a second group of four ferroelectric crystal translators, each of said crystal translators having input and output electrodes and electrically distinct output conductors individually connected to said output electrodes, means for selectively connecting each of the output conductors of said initial stage crystal translators to one input electrode of said crystal translators in said first group and to one input electrode of said crystal translators in said second group, means for selectively energizing input electrodes in said initial stage crystals, and means for conditioning a selected one of said groups of crystals in said second stage to an operative state thereby energizing one of said output conductors in said selected group of crystal translators.

12. A ferroelectric translator in accordance with claim 11 wherein each of said crystal translators in said first and second groups comprises a slab of ferroelectric material, said input electrodes being disposed on one face of said slab, said output electrodes being disposed on the opposite face of said slab and positioned to intersect said input electrodes in accordance with a code to be translated, unit area condensers being formed at the intersection of said electrodes, spaced first and second common electrodes disposed on said one face and positioned to intersect all of said output electrodes to form a number of additional condensers, the sum of the areas of each of said additional condensers formed between said common electrodes and a particular output electrode being equal to the sum of the areas of said condensers formed between said input electrodes and said particular output electrode.

13. A ferroelectric translator comprising a plurality of stages, one of said stages including a group of diode "and" gates, another of said stages including crystal translators having input and output electrodes and electrically distinct output conductors individually connected to said output electrodes, said translators being divided into two subgroups, means for connecting said diode "and" gates to the input electrodes of said crystal translators in each of said subgroups, means for selectively energizing said diode gates and selectively conditioning one of said subgroups of crystal translators to an operative state thereby energizing one of said output electrodes in said selected group of crystal translators, a plurality of ferroelectric condensers connected to the output conductors of said first and second subgroups, and a terminal stage of crystal translators connected to said ferroelectric condensers.

14. A ferroelectric translator comprising a plurality of stages, one of said stages including a group of diode "and" gates, another of said stages including crystal translators having input and output electrodes and electrically distinct output conductors individually connected to said output electrodes, said translators being divided into two subgroups, means for connecting said diode "and" gates to the input electrodes of said crystal translators in each of said subgroups, means for selectively energizing said diode gates and selectively conditioning one of said subgroups of crystal translators to an operative state thereby energizing one of said output conductors in said selected subgroup of crystal translators, a plurality of ferroelectric condensers connected to the output conductors of said first and second subgroups, and a terminal stage of crystal translators connected to said ferroelectric condensers, wherein said crystal translators in said first and second subgroups comprise a slab of ferroelectric material, said input electrodes being disposed on one face of said slab, said output electrodes being disposed on the opposite face of said slab and positioned to intersect said input electrodes in accordance with a code to be translated, unit area condensers being formed at the intersection of said electrodes, spaced first and second common electrodes disposed on said one face and positioned to intersect all of said output electrodes to form a number of additional condensers, the sum of the area of each of said additional condensers formed between said common electrodes and a particular output electrode being equal to the sum of the areas of said condensers formed between said input electrodes and said particular output electrode.

15. A ferroelectric translator comprising a plurality of stages, one of said stages including a group of diode "and" gates, another of said stages including crystal translators having input and output electrodes and output conductors individually connected to said output electrodes, said translators being divided into two subgroups, means for connecting said diode "and" gates to the input electrodes of said crystal translators in each of said subgroups, means for selectively energizing said diode gates and conditioning one of said subgroups of crystal translators to an operative state thereby energizing one of said output electrodes in said selected group of crystal translators, a plurality of ferroelectric condensers connected to the output conductors of said subgroups, and a terminal stage of crystal translators connected to said ferroelectric condensers, wherein said crystal translators in said first and second subgroups include a slab of ferroelectric material, said input electrodes being spaced on one face of said slab, said output electrodes being spaced on the opposite face of said slab and positioned to intersect said input electrodes in accordance with a code to be translated, condensers being formed at the intersection of said electrodes having a first initial polarity, first and second tank electrodes disposed on said one face of said slab and positioned to intersect all of said output electrodes to form additional condensers having a second initial polarity, the sum of the areas of said additional condensers formed between said tank electrodes and a particular output electrode being equal to the sum of the areas of said condensers formed between said input electrodes and said particular output electrode, and means for varying the initial polarity of said condensers formed between said second tank electrode and said particular output electrode.

16. A ferroelectric crystal translator comprising a plurality of stages, each of said stages including a group of ferroelectric crystal translators having input and output electrodes and electrically distinct output conductors individually connected to said output electrodes, means for selectively connecting the output conductors of one of said stages to the input electrodes of a succeeding one of said stages in accordance with a code to be translated, inverter amplifier means connected to the input electrodes of said one stage, amplifier means interposed between the output conductors of said one stage and the input electrodes of said succeeding stage, means for selectively activating said input electrodes to said one stage to activate one of said output conductors of said succeeding stage, and means for reorienting said crystal translators to an initial polarization condition.

17. A ferroelectric translator in accordance with claim 16 including, in addition, means for initially polarizing said one stage to a given polarization condition and for initially polarizing said succeeding stage to a different polarization condition.

18. A ferroelectric translator in accordance with claim 16 wherein said crystal translators in said stages comprise a slab of ferroelectric material, said input electrodes being spaced on one face of said slab, said output electrodes being spaced on the opposite face of said slab and positioned to intersect said input electrodes in accordance with a code to be translated, unit area condensers being formed at the intersection of said electrodes and having a first initial polarity, a tank electrode disposed on said one face and positioned to intersect all of said output electrodes to form additional condensers having a second initial polarity, the area of each of said additional condensers formed between said tank electrode and a particular output electrode being one unit less than the sum of the units of area of said condensers formed between said input electrodes and said particular output electrode, means connecting said tank electrode to a source of reference potential, and means for activating selected input electrodes in accordance with the code to be translated thereby to energize one of said output conductors.

19. A ferroelectric translating device including an initial stage and a terminal stage of ferroelectric crystal translators, each of said translators comprising a plurality of ferroelectric condensers, said crystal translators having input electrodes and output electrodes and a plurality of output conductors individually connected to said output electrodes, inverter amplifier means connected to the input electrodes of said initial stage, amplifier means coupling said output conductors of said initial stage to said input electrodes of said terminal stage, said terminal stage including two groups of crystal translators, means for selectively conditioning one of said groups to an operative state, and means effective on the activation of said initial stage input electrode and the conditioning of one of said groups to an operative state to energize only one of said output conductors from said one group, wherein said crystal translators in said initial stage comprise a ferroelectric translator comprising a slab of ferroelectric material, said input electrodes being disposed on one face of said slab, said output electrodes being disposed on the opposite face of said slab and positioned to intersect said input electrodes in accordance with a code to be translated, unit area condensers being formed at the intersection of said electrodes, and a tank electrode disposed on said one face of said slab and positioned to intersect all of said input electrodes to form additional condensers, the area of each of said additional condensers formed between said tank electrode and a particular output electrode being one unit less than the sum of the units of area of said condensers formed between said input electrodes and said particular output electrode, and means connecting said tank electrode to a source of reference potential, and wherein said crystal translators in said terminal stage comprise a ferroelectric translator comprising a slab of ferroelectric material, said input electrodes being disposed on one face of said slab, said output electrodes being disposed on the opposite face of said slab and positioned to intersect in accordance with a code to be translated, unit area condensers being formed at the intersection of said electrodes, spaced first and second common electrodes disposed on said one face and positioned to intersect all of said output electrodes to form a number of additional condensers, the sum of the areas of each of said additional condensers formed between said common electrodes and a particular output electrode being equal to the sum of the areas of said condensers formed between said input electrodes and said particular output electrode.

20. A ferroelectric "and" gate comprising a slab of ferroelectric material, spaced input electrodes disposed on one face of said slab, spaced output electrodes disposed on the opposite face of said slab and positioned to intersect said input electrodes in accordance with a code to be translated, a plurality of output conductors individually connected to said output electrodes, unit area condensers being formed at the intersection of said electrodes, a common input electrode disposed on said one face of said slab and positioned to intersect all of said output electrodes to form additional condensers, the area of said additional condensers formed between said common electrode and a particular output electrode being one unit less than the sum of the units of area of said condensers formed between said input electrodes and said particular output electrode, and means for applying input signals to each of said input electrodes and said common electrode intersected by a particular output electrode to produce an output signal at said particular output electrode and conductor when, and only when, input signals are applied to all of said input electrodes and said common electrode intersected by said particular output electrode.

References Cited in the file of this patent

UNITED STATES PATENTS

| | | |
|---|---|---|
| 2,666,195 | Bachelet | Jan. 12, 1954 |
| 2,717,372 | Anderson | Sept. 6, 1955 |
| 2,876,435 | Anderson | Mar. 3, 1959 |
| 2,956,265 | Schwenzfeger | Oct. 11, 1960 |

FOREIGN PATENTS

| | | |
|---|---|---|
| 162,314 | Australia | July 1, 1954 |